INVENTORS:
HANS-GEORG TRIESCHMANN
WOLFGANG RAU
THEODOR JACOBSEN
HELMUT PFANNMUELLER

United States Patent Office 3,652,527
Patented Mar. 28, 1972

3,652,527
POLYMERIZATION OF PROPYLENE WITH ZIEGLER CATALYSTS IN A STIRRED GAS PHASE REACTOR
Hans-Georg Trieschmann, Hambach, Wolfgang Rau, Heidelberg, and Theodor Jacobsen and Helmut Pfannmueller, Limburgerhof, Germany, assignors to Badische Anilin- & Soda-Fabrik Aktiengesellschaft, Ludwigshafen (Rhine), Germany
Filed Oct. 27, 1969, Ser. No. 869,577
Claims priority, application Germany, Oct. 29, 1968, P 18 05 765.3
Int. Cl. C08f 1/42, 3/08
U.S. Cl. 260—93.7         7 Claims

ABSTRACT OF THE DISCLOSURE

A process for the polymerization of propylene in the gas phase in a bed of powdered polypropylene by means of a catalyst system of: (a) a solution of an aluminum alkyl in a hydrocarbon; and (b) a suspension of a titanium or vanadium halide compound in a hydrocarbon; in which the two components (a) and (b) are supplied separately to the reaction zone.

Figure 2:
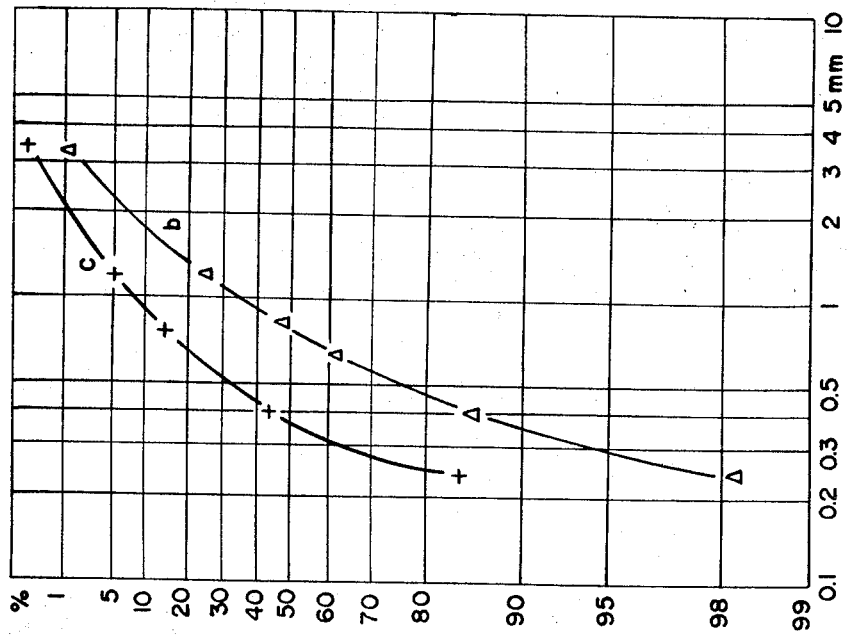

In accordance with the invention the process comprises introducing the component (a) uniformly direct into the stirred powder bed and introducing the component (b) uniformly into the gas space above the powder bed or by introducing component (a) uniformly into the gas space above the powder bed and introducing component (b) uniformly into the stirred powder bed.

The use of the measures described results in a high catalyst yield and a product having a uniform particle size.

The invention relates to a process for the polymerization of propylene in the gas phase in which the components of the catalyst are fed separately into the reaction zone.

Polymerization of propylene in the gas phase with Ziegler catalysts is known and practised on an industrial scale. Ziegler catalysts consist of (a) an alkyl aluminum and (b) a titanium or vanadium halide compound. In this method the catalyst residues remain in the product. If they are contained therein in too high a concentration, they are troublesome in further processing. Attempts are therefore made to obtain the highest possible catalyst yields. On the other hand the product should have the narrowest possible particle size distribution and good free-flowing properties.

It has been found that one of the most difficult problems in the process is that of feeding the catalyst components into the reaction zone. If the catalyst components are supplied together into the reaction zone in the form of a dispersion in a hydrocarbon, reaction of the components may take place immediately on mixing and this may result in a marked loss in activity. Since very rapid polymerization with a strong evolution of heat takes place at the point of entry of the catalyst mixture into the reaction zone because of the high concentration of the same in the presence of monomers, the polypropylene formed may fuse together and nodules or even lumps may be formed. This effect cannot be entirely avoided even when the catalyst components are introduced separately by way of the gas space of the reactor.

It is an object of this invention to provide a process according to which propylene can be polymerized in the gas phase with a high catalyst yield and a product having a very uniform particle size is obtained without the formation of agglomerates.

We have now found that this object is achieved in the polymerization of propylene in the gas phase in the presence of a powder bed by means of a Ziegler catalyst system of (a) an alkyl aluminum and (b) a titanium or vanadium halide compound in which the components (a) and (b) in the form of solutions or suspensions in hydrocarbons are supplied separately to the reaction zone, by introducing a solution of component (a) direct into the stirred powder bed and uniformly metering the suspension of component (b) into the gas space above the powder bed.

High catalyst yields and a product having a narrow particle size distribution and which does not contain any nodules or lumps are achieved by the said method.

The process may also be carried out by introducing the solution of component (a) into the gas space above the powder bed and uniformly metering the suspension of component (b) into the stirred powder bed.

In this case even higher catalyst yields are achieved but the particle size distribution is somewhat broader.

The process is suitable for the polymerization of propylene which may be mixed with up to 15% by weight of one or more comonomers, for example ethylene. To achieve a high catalyst yield it is necessary for the propylene to be present in a very pure form. Gas purification may be carried out advantageously by conventional methods by means of absorbents, for example aluminum oxide.

All known alkyl aluminum compounds, for example triethyl aluminum, diethyl aluminum monochloride or ethyl aluminum sesquichloride, may be used as the catalyst component (a).

Conventional titanium halogen compounds, for example titanium trichlorides or titanium tetrachloride, may be used together with a reducing agent as catalyst component (b). It is preferred to use finely powdered titanium trichloride which has been prepared by reduction with metallic aluminum and therefore contains aluminum chloride.

The titanium halide compound may also be modified with electron donors, for example hexamethylphosphoric triamide. The molar ratio of alkyl aluminum to titanium compound may preferably be from 0.5:1 to 6:1.

The catalysts are used in the form of suspensions or solutions in hydrocarbons. Gasoline or cyclohexane are preferred. The polymerization may be carried out batchwise, but in industry it is advantageous to carry it out continuously. Reactors of conventional design and size may be used whose ratio of height to diameter of the cross-section is preferably from 4:1 to 1:1.

During the polymerization, the reactor is filled to a certain height, preferably to the extent of about 60% to 80% of its volume, with polypropylene powder which is kept moving with a stirrer. At the rate at which fresh polypropylene is formed by polymerization, the product is discharged through suitable means so that the level of the powder bed in the reactor remains constant.

Polymerization of the propylene is carried out at temperatures of from 60° to 110° C. and at pressures of from 10 to 45 atmospheres, preferably at from 80° to 100° C. and from 30 to 45 atmospheres. Removal of the heat of polymerization may be carried out by conventional jacket cooling but more advantageously by evaporative cooling such as is described for example in U.S. patent application Ser. No. 750,941.

The two components of the catalyst are supplied separately to the reaction zone. It is essential that one component is introduced into the gas space above the powder bed and the other direct into the powder bed.

Figure 1:
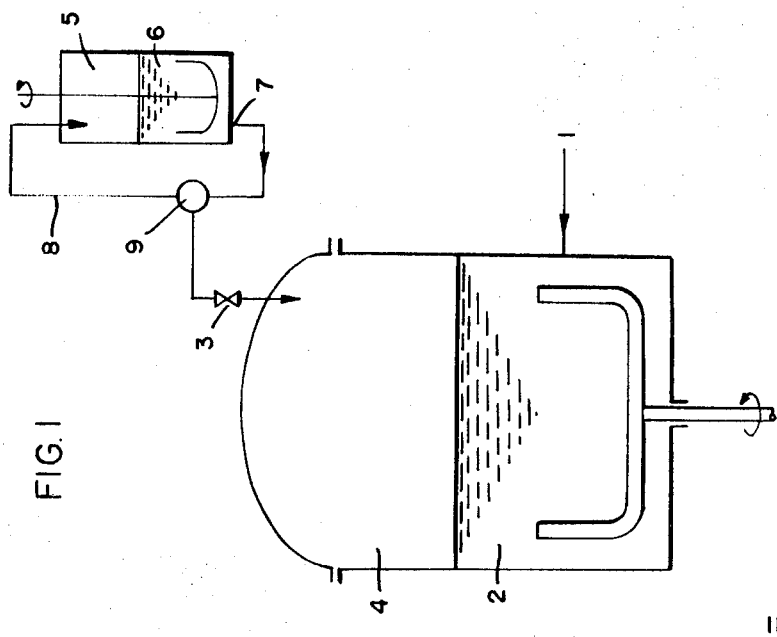

According to a preferred embodiment (using apparatus as shown diagrammatically in FIG. 1 of the drawings) the component (a), namely an alkyl aluminum 1, is introduced as a solution at the bottom of the reactor or through the wall of the same or through a tube from the top which projects deep into the reactor. It is essential that the solution enters directly into the stirred powder bed 2 and not into the gas space. However, the catalyst component (b), namely the titanium halide 3, is introduced into the gas space 4 above the powder bed.

In another embodiment the procedure is reversed; the alkyl aluminum is introduced into the gas space and the titanium halide into the powder bed.

In both cases it is necessary to meter in the titanium halide uniformly in order to achieve a uniform course of the polymerization. Since such catalysts are insoluble in conventional solvents, they have to be suspended in hydrocarbons and metered in in this form. Titanium halide 3 may be fed together with an inert hydrocarbon into a separate reservoir 5 in which it is held in suspension 6 by vigorous stirring. Stirring alone is often not sufficient to prevent the suspension from settling; it is therefore advisable to circulate the suspension by withdrawing it at 7 at the bottom of the reservoir, pumping it through a line 8 and returning it to the top of the reservoir 5. By connecting the circulation pipe 8 by a short path with the suction side of a piston metering pump 9 whose pressure side communicates with the reactor, exact and uniform metering of the titanium halide suspension can be achieved in a simple manner.

The following example illustrates the invention.

EXAMPLE

A 5-m.$^3$ reactor having a ratio of height to diameter of 2.1:1 is filled with about 850 kg. of polypropylene. Propylene is forced in at a pressure of 35 atmospheres gauge. 650 ml. per hour of a 5% suspension of $TiCl_3 \cdot \frac{1}{3} AlCl_3$ in cyclohexane and 480 ml. of a 20% solution of $Al(C_2H_5)_3$ in cyclohexane are introduced continuously in the manner described below. The temperature in the powder bed is kept at about 90% C. by evaporative cooling. Polypropylene is continuously discharged through a dip tube and cyclone at the rate at which it is formed by polymerization.

(a) The two components of the catalyst are introduced separately into the reactor from the top through the gas space for purposes of comparison. A mean catalyst yield of only 10,000 to 12,000 g. of propylene per g. of $TiCl_3$ is obtained.

The product contains nodules and even lumps which sometimes clog up the discharge tube so that operation often has to be interrupted and the lines cleaned.

(b) According to the preferred embodiment (cf. FIG 1) the titanium component 3 is introduced into the gas space 4 and the aluminum compound 1 into the powder bed 2. A catalyst yield of 15,000 to 17,000 g. per g. of $TiCl_3$ obtained; the product has a fairly narrow distribution of particle sizes. Only 2% of the particles is larger than 3 mm. and only 5% is smaller than 0.3 mm. FIG. 2 shows the particle size distribution (curve $b$). The product obtained has good free-flowing properties and is therefore very suitable for further processing. There is no difficulty in conveying and separating the product.

(c) According to the other embodiment, the titanium compound is introduced direct into the powder bed and the aluminum compound into the gas space. Although a higher catalyst yield (20,000 to 22,000 g. per g. of $TiCl_3$) is thus obtained, the product has a broader particle size distribution. 32% of the particles has a diameter of less than 0.3 mm. FIG. 2 shows the particle size distribution (curve $c$). The finely powdered fraction impairs the free-flowing properties of the polypropylene so that pneumatic conveyance in cyclones is adversely affected to a slight degree.

Polymerization by method (b) or (c) may be carried on continuously for several months without disturbances.

We claim:

1. A process for polymerizing propylene in the gas phase in the presence of a bed of powdered polypropylene by means of a Ziegler catalyst system comprising (a) an alkyl aluminum compound and (b) a titanium or vanadium halide compound, wherein one of the components (a) and (b) is fed as a solution or suspension in a hydrocarbon directly into the stirred powder bed and the other component is fed into the gas space above the powder bed, component (b) being metered in uniformly, said powder bed being agitated by means of a mechanical stirrer.

2. A process as claimed in claim 1 wherein a solution of component (a) is introduced direct into the stirred powder bed and a suspension of component (b) is uniformly metered into the gas space above the powder bed.

3. A process as claimed in claim 1 wherein a solution of component (a) is introduced into the gas space above the powder bed and a suspension of component (b) is uniformly metered into the stirred powder bed.

4. A process as claimed in claim 1 wherein the ratio of component (a) to component (b) is from 0.5:1 to 6:1.

5. A process as claimed in claim 1 wherein a reactor is used having a ratio of height to diameter of 4:1 to 1:1.

6. A process as claimed in claim 1 wherein the bed of polypropylene powder, kept in motion by a stirrer, occupies from about 60 to 80% of the volume of the reactor.

7. A process as claimed in claim 1 carried out at from 60° to 110° C. and from 10 to 45 atmospheres.

References Cited

UNITED STATES PATENTS 3,256,263  6/1966  Wisseroth et al. ___ 260—94.9 B

FOREIGN PATENTS 709,470  5/1965  Canada _____ 260—94.9 B

JOSEPH L. SCHOFER, Primary Examiner

A. HOLLER, Assistant Examiner

U.S. Cl. X.R.

260—88.2 B, 94.9 B, 94.9 P